H. A. ORME.
SELF FEEDING SOLDERING IRON.
APPLICATION FILED FEB. 6, 1915.
1,152,043.
Patented Aug. 31, 1915.
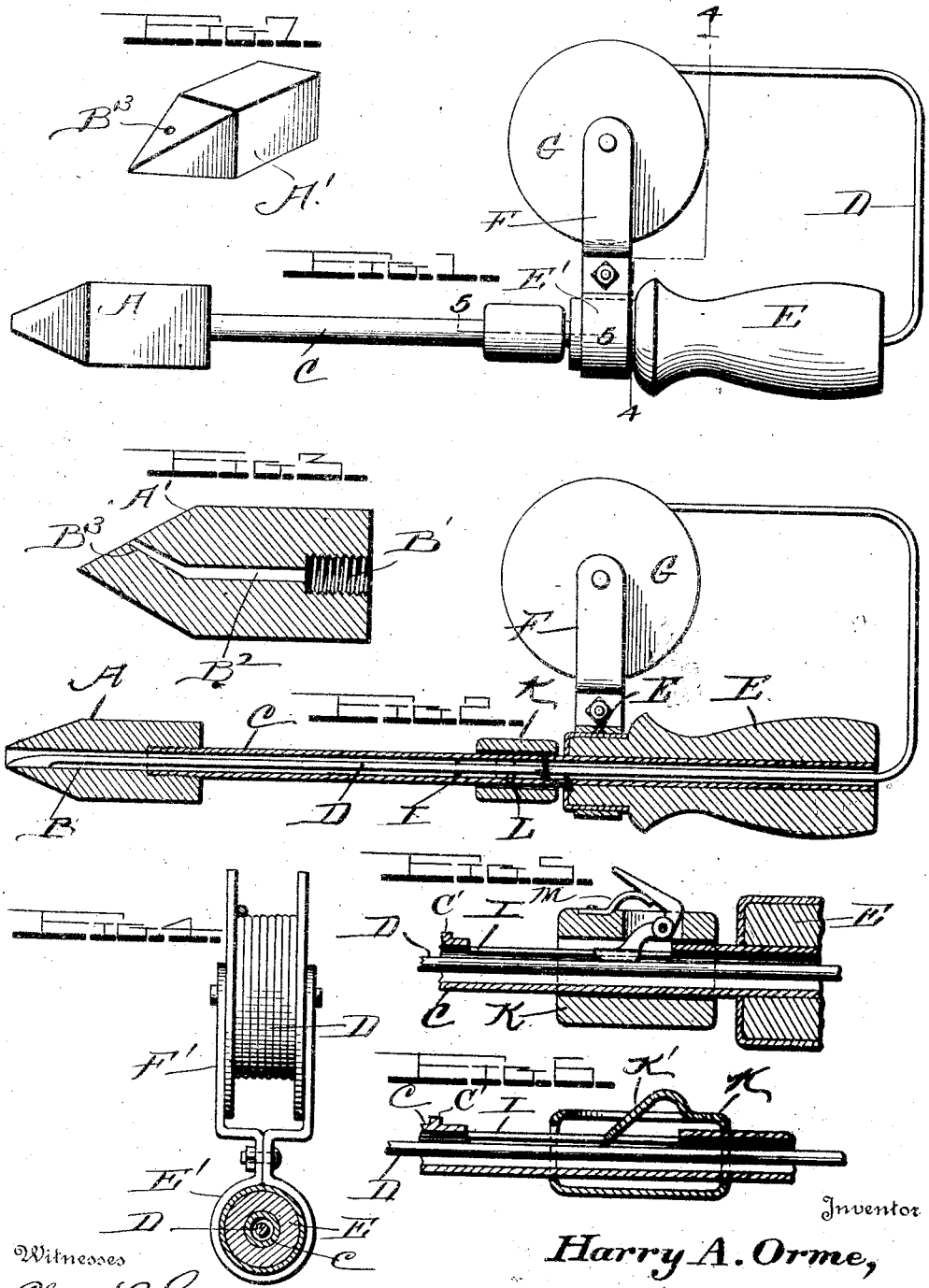
Witnesses
Chas. L. Griesbauer.
E. B. McBath
Inventor
Harry A. Orme,
By Chas E. Brock

UNITED STATES PATENT OFFICE.

HARRY A. ORME, OF WASHINGTON, DISTRICT OF COLUMBIA.

SELF-FEEDING SOLDERING-IRON.

1,152,043.  Specification of Letters Patent.  Patented Aug. 31, 1915.

Application filed February 6, 1915. Serial No. 6,515.

*To all whom it may concern:*

Be it known that I, HARRY A. ORME, a citizen of the United States, residing at Washington, District of Columbia, have invented a new and useful Self-Feeding Soldering-Iron, of which the following is a specification.

This invention relates generally to hand soldering irons, and more particularly to one in which the solder is fed to the iron in a solid condition, and flows therefrom ready for application, thereby avoiding the necessity of holding the stick of solder in one hand and applying the heated end of the iron thereto by the other hand.

Another object of the invention is to provide a tool which will carry a considerable amount of solder in compact form and which is fed as needed to the iron whereas before stated it is melted and caused to flow at the proper point ready for smoothing by the point of the iron.

Another object of the invention is to provide a tool of this kind with a suitable easily operated hand feeding mechanism for the purpose of supplying the iron from time to time with proper quantities of solder.

Another object of the invention is to provide a tool having the solder carrying means of such size and shape and so arranged that the iron can be rested upon the usual hydrocarbon torches now in use for the purpose of heating the iron.

With these various objects in view my invention consists in the novel features of construction, combination, or arrangement all of which will be fully described hereinafter and pointed out in the claims.

In the drawings forming a part of this specification Figure 1, is a view of a tool embodying my invention. Fig. 2 is a longitudinal sectional view of the same showing the iron adapted for heavy work. Fig. 3 is a sectional view of an iron particularly adapted for small or fine work. Fig. 4 is a section on the line 4—4 of Fig. 1. Fig. 5 is an enlarged detail view of one form of the solder feeding means, and, Fig. 6 is a view showing a slightly modified construction of the feeding means. Fig. 7 is a perspective view of the head shown in Fig. 3.

In constructing a tool in accordance with my invention I employ an iron head A, which has a passage B, extended longitudinally and centrally through the same, it being understood that this form of iron is intended for heavy work and is adapted to discharge the molten solder at the forward end of the head, this head being pointed as shown after the usual manner of soldering iron.

The rear end of the passage B is threaded and the forward end of a tube C, is threaded into said rear end, said tube being of such size as to permit a strand of solder D, to be passed therethrough and as the passage B, is of the same size, the solder will be passed from the tube into the head and when it reaches the forward end of said head the heat will be sufficient to melt the same and cause it to flow out at the forward end following the path of the acid upon the metal to be soldered.

The tube C is of a length suited to the size and weight of the head A, and upon the rear end thereof is placed a wooden handle E, the tube C, extending entirely through said handle as shown. The forward end of the handle is slightly reduced as usual and is provided with an encircling metallic ferrule E', and fastened upon this ferrule is a bifurcated yoke or support F, within which is mounted a reel G, having a continuous strand of solder D, coiled thereon, the outer end of such strand being carried off of the reel and passed around into the rear end of the tube C, where it is forced along into the soldering head A, where its forward end is melted and caused to flow out as previously described, and as fresh quantities are desired the solder is unreeled and fed through the handle and tube to the head of the iron.

In Fig. 3 it will be noted that the passage B', does not extend centrally through the iron and it will also be noted that it is slightly contracted as shown at B², and still further contracted and inclined upwardly as shown at B³, so that it emerges not at the point of the iron, but a short distance back of and above said point. This is the form of iron which I have found to be particularly well adapted for small and fine work, the melting of the solder taking place in the portions B², and B³, of the passage and emerging upon the pointed end down which it flows to the place desired, and the smoothing process can be carried on the same as usual.

After the tool such as I have described, has been used the strand of solder can be drawn out, and by shaking the iron the solder remaining in the head can be thrown out and by blowing through the tube every particle of the molten metal can be removed from the iron.

In order to feed the solder intermittently to the head as needed various forms of hand operated feeding devices can be employed and I have shown two such devices, and it is obvious that other forms can be used equally as well. An elongated opening I, is produced in the tube just in advance of the ferrule of the handle, and sliding freely upon the tube is a sleeve K, carrying a pivoted dog L, which is adapted to be pressed by the thumb as the sleeve is pushed forward by such operation, and the inner end of the dog engaging the strand of solder in the tube feeds the same along for a distance equal to the movement of the sleeve. The forward movement of the sleeve is checked by means of a small stop placed upon the exterior of the tube. The sleeve is returned also by the movement of the thumb, and as pressure will be relieved from the dog it is lifted by a small spring M, resting under the head of the dog.

In the other form of feeding device, I punch a tongue K′ from the sleeve K, and shape the same so that by pressing upon said tongue during the forward movement of the sleeve its inner end will engage the solder in the tube and feed the same forward, and on the return movement the inherent elasticity of the tongue will lift it clear of the solder, and the sleeve can be easily moved back to take a fresh grip upon the solder. It will be understood that the feeding sleeve is so placed as to be within easy reach of the thumb of the operator, holding the handle of the tool in the palm of the hand, as usual.

It will thus be seen that I provide an exceedingly simple and highly efficient soldering iron capable of carrying out and accomplishing all of the objects hereinbefore mentioned.

What I claim is:

1. A tool of the kind described, comprising a head having a passage extending therethrough, a tube attached to said head and communicating with the passage, a handle arranged upon the rear end of said tube, and a solder carrying reel supported from said handle for the purpose set forth.

2. A tool of the kind described comprising a head having a passage extending therethrough, a tube attached to the head and communicating with the passage, a handle on the rear end of said tube, a solder carrying reel mounted upon said handle, and a reciprocating thumb operated feeding device arranged upon the tube in advance of the handle for the purpose of feeding the solder through the tube to the head.

3. A tool of the kind described, comprising a head having a passage extending therethrough, a tube connected to said head and communicating with said passage, a handle upon the rear end of said tube, a solder carrying reel mounted upon said handle, the tube having an opening therein in advance of said handle, a sleeve surrounding said tube and adapted to be moved back and forth upon the same, and dog carried by said sleeve and adapted to work through the opening in the tube to engage the solder and feed the same through the tube to the head.

HARRY A. ORME.

Witnesses:
CHAS. E. BROCK,
E. B. McBATH.